US010963199B2

(12) United States Patent
Ueno

(10) Patent No.: US 10,963,199 B2
(45) Date of Patent: Mar. 30, 2021

(54) IMAGE FORMING APPARATUS FOR RECEIVING VOICE INSTRUCTIONS

(71) Applicant: SHARP KABUSHIKI KAISHA, Sakai (JP)

(72) Inventor: Toshihiro Ueno, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/748,197

(22) Filed: Jan. 21, 2020

(65) Prior Publication Data

US 2020/0241817 A1    Jul. 30, 2020

(30) Foreign Application Priority Data

Jan. 30, 2019   (JP) .............................. JP2019-014348

(51) Int. Cl.
*G06F 3/12*        (2006.01)
*G06F 3/16*        (2006.01)
*G10L 15/26*       (2006.01)

(52) U.S. Cl.
CPC .......... *G06F 3/1256* (2013.01); *G06F 3/1204* (2013.01); *G06F 3/1206* (2013.01); *G06F 3/167* (2013.01); *G10L 15/26* (2013.01)

(58) Field of Classification Search
CPC ....... G06F 3/1256; G06F 3/1204; G06F 3/167
See application file for complete search history.

(56) References Cited

U.S. PATENT DOCUMENTS

| | | | |
|---|---|---|---|
| 2015/0036174 A1* | 2/2015 | Pettis .................... | G06F 3/1288 358/1.15 |
| 2017/0255428 A1* | 9/2017 | Suzuki .................. | G06F 3/1288 |
| 2020/0076969 A1* | 3/2020 | Ikeda .................... | G06F 3/1258 |
| 2020/0175984 A1* | 6/2020 | Iwasa ................. | H04N 1/00403 |

FOREIGN PATENT DOCUMENTS

JP        2007-018090 A        1/2007

* cited by examiner

*Primary Examiner* — Eric A. Rust
(74) *Attorney, Agent, or Firm* — ScienBiziP, P.C.

(57) ABSTRACT

An image forming system includes an image forming apparatus, a server, and an audio device including an audio inputter. The server includes a text converter, a specific-word extractor, a job-specific-information manager, a storage, and a job setter. The text converter converts audio data input from the audio inputter to text information. The specific-word extractor extracts a specific word from the text information. The job-specific-information manager specifies a job corresponding to the specific word. The storage stores job specific information. The job setter sets the specified job as a job to be executed. The image forming apparatus includes a job executor that executes a job set in the server.

10 Claims, 16 Drawing Sheets

FIG. 6

JOB SETTING INFORMATION

| SETTING NAME | JOB | USER | SETTING ITEM | DISPLAY VALUE | SETTING VALUE |
|---|---|---|---|---|---|
| WRITTEN APPROVAL | SCAN | YAMADA | COLOR | MONOCHROME | Mono |
| WRITTEN APPROVAL | SCAN | YAMADA | SENDING METHOD | E-MAIL | Email |
| WRITTEN APPROVAL | SCAN | YAMADA | DESTINATION | SUPPLIES DEPARTMENT | shizai@abcd.com |
| WRITTEN APPROVAL | SCAN | YAMADA | CC | SELF | yamada@abcd.com |
| WRITTEN APPROVAL | COPY | YAMADA | COLOR | MONOCHROME | Mono |
| WRITTEN APPROVAL | COPY | YAMADA | STAPLE | WITH STAPLES | ON |
| QUOTATION REQUEST | SCAN | SATO | COLOR | POLYCHROME | Color |
| QUOTATION REQUEST | SCAN | SATO | DOCUMENT | BOTH SIDES | Duplex |
| QUOTATION REQUEST | SCAN | SATO | SENDING METHOD | SHARED FOLDER | SMB |
| QUOTATION REQUEST | SCAN | SATO | DESTINATION | QUOTATION REQUEST | ¥¥fileshare¥QUOTATION REQUEST |
| QUOTATION REQUEST | SCAN | SATO | CC | SELF | sato@abcd.com |

FIG. 7

USER INFORMATION

| NAME | E-MAIL ADDRESS |
|---|---|
| YAMADA | yamada@abcd.com |
| SATO | sato@abcd.com |

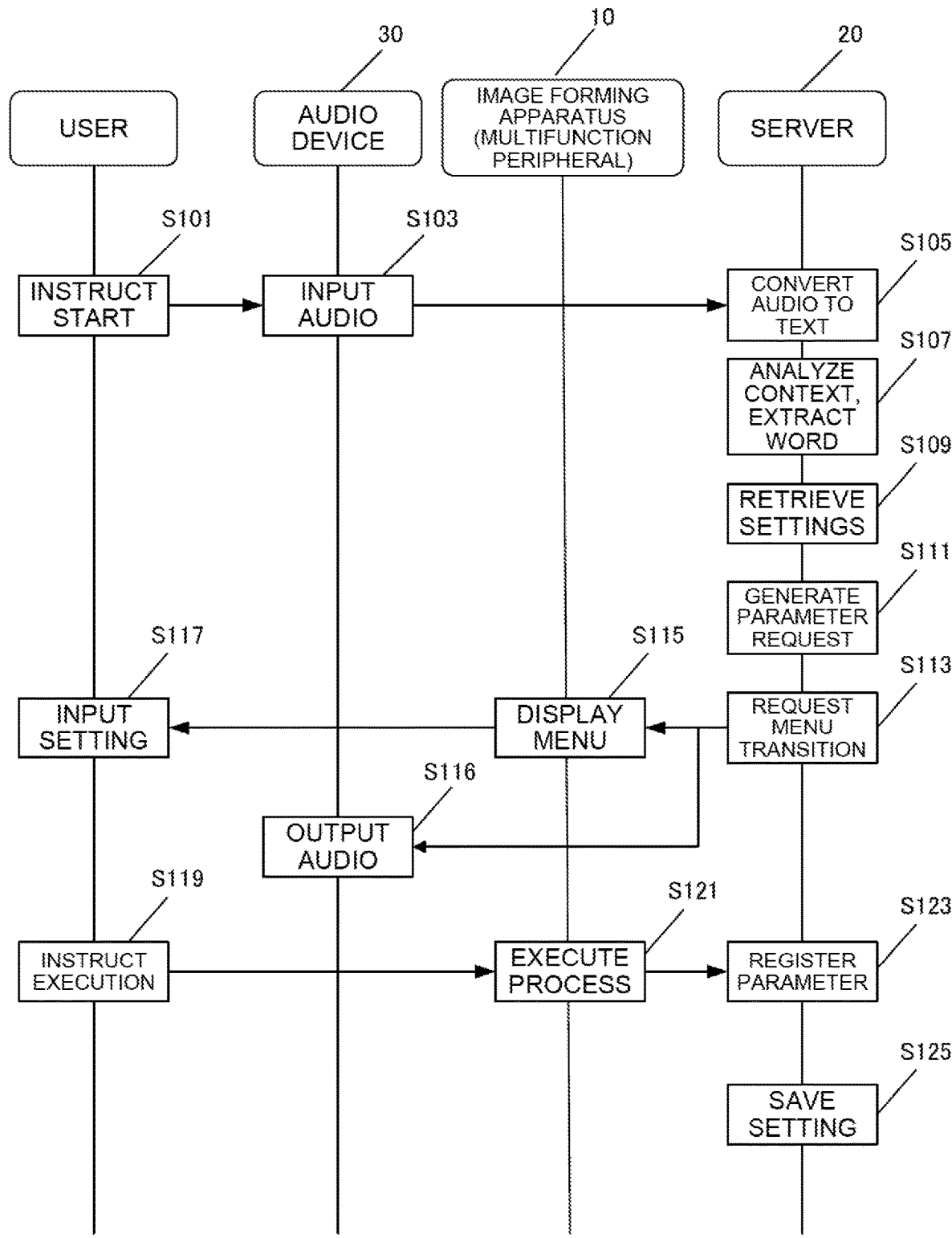

IMAGE FORMING APPARATUS FOR RECEIVING VOICE INSTRUCTIONS

This Nonprovisional application claims priority under 35 U.S.C. § 119(a) on Patent Application No. 2019-014348 filed in Japan on 30 Jan. 2019, the entire contents of which are hereby incorporated by reference.

BACKGROUND OF THE INVENTION

Field of the Invention

The present invention relates to an image forming system, and more particularly to an image forming system that is able to receive a voice instruction.

Description of the Background Art

Some typical image forming systems include audio inputters and audio outputters. An image forming apparatus of such an image forming system responds to voice instructions of a user through dialogue between the user and the apparatus so as to set and process jobs, without depending on manual operation of an operation panel, etc., of the apparatus.

A traditional voice-operated instruction device is disclosed in Japanese Unexamined Patent Application Publication No. 2007-18090. In response to a voice-operated instruction input to an audio inputter by a user to select a setting on a lower-level menu among hierarchically structured menus that are displayable on a display, a display controller causes the display to display the menus in an order from the higher-level menu to the lower-level menu.

As a result, it is possible to proceed to the lower-level menu while sequentially checking the settings on the menus of the respective levels and the selected settings.

According to the technology of Japanese Unexamined Patent Application Publication No. 2007-18090, instructions similar to those issued through manual operations on displayed menus can be issued through voice-operated instructions. However, the voice-operated instructions should be issued in accordance with the menu displayed at the time among the multiple displayable menus. Therefore, it is difficult to issue simple voice-operated instructions.

Another issue involving an image processing apparatus is that, actual scanning of a document in a standard format output on paper in response to a voice-operated instruction requires individual settings of paper size, resolution, destination, etc. depending on the document, even when the content to be processed is determined by the document.

It is convenient to pre-register detailed settings appropriate to each document, for example, as "recommended settings". However, such pre-registration of settings requires the user to search for and select the appropriate settings. Searching for suitable settings becomes a daunting task as the number of settings increases.

A user may register "recommended settings" as described above. However, if there are many different "recommended settings" registered, it will be difficult for the user to find a desired setting value (setting condition) on the menu because display area of the menu is limited.

An object of the embodiments, which have been conceived in view of the above-described conventional problems, is to provide an image forming system that is able to readily set and process a job desired by a user through voice instructions.

SUMMARY OF THE INVENTION

An image forming system according to an embodiment includes an image forming apparatus, a server, and an audio inputter that receives an input of audio. The server includes a text converter, a specific-word extractor, a job-specific-information manager, and a job setter. The text converter converts audio data input from the audio inputter to text information. The specific-word extractor extracts a specific word from the text information. The job-specific-information manager specifies a job corresponding to the specific word. The job setter sets the specified job as a job to be executed. The image forming apparatus includes a job executor that executes a job set in the server.

The image forming apparatus according to an embodiment is able to receive a voice instruction. The image forming apparatus includes an audio inputter, a text converter, a specific-word extractor, a job-specific-information manager, a job setter, and a job executor. The audio inputter receives an input of voice. The text converter converts the audio data input from the audio inputter to text information. The specific-word extractor extracts a specific word (keyword) from the text information. The job-specific-information manager specifies a job corresponding to the specific word. The job setter sets the specified job as a job to be executed. The job executor executes the specified job established by the job setter.

A method of forming an image according to an embodiment in which a voice instruction is received, the method including receiving an input of voice; converting data of the received voice input to text information; extracting a specific word (keyword) from the text information; specifying a job corresponding to the specific word; setting the specified job as a job to be executed; and executing the set specified job.

A non-transitory computer-readable recording medium according to an embodiment, the medium storing therein a program for an image forming apparatus that receives a voice instruction, the program causing a computer of the image forming apparatus to function as receiving an input of voice; converting audio data of the received input of voice to text information; extracting a specific word (keyword) from the text information; specifying a job corresponding to the specific word; setting the specified job as a job to be executed; and executing the set specified job.

An image forming system according to an embodiment includes an audio inputter that receives an input of voice. The image forming system converts audio data input from the audio inputter to text information, extracts a specific word from the text information, and specifies a job corresponding to the specific word. The image forming system then sets the specified job as a job to be executed. In this way, an image forming system is provided that can readily set and process jobs desired by a user through voice instructions.

BRIEF DESCRIPTION OF THE DRAWINGS

FIG. 6 is a table illustrating an example of job specific information;

FIG. 7 is a table illustrating an example of user information;

FIG. 8 is a sequence diagram illustrating processing steps performed by the image forming system when a voice instruction is received;

DESCRIPTION OF THE PREFERRED EMBODIMENTS

First Embodiment

Figure 1:
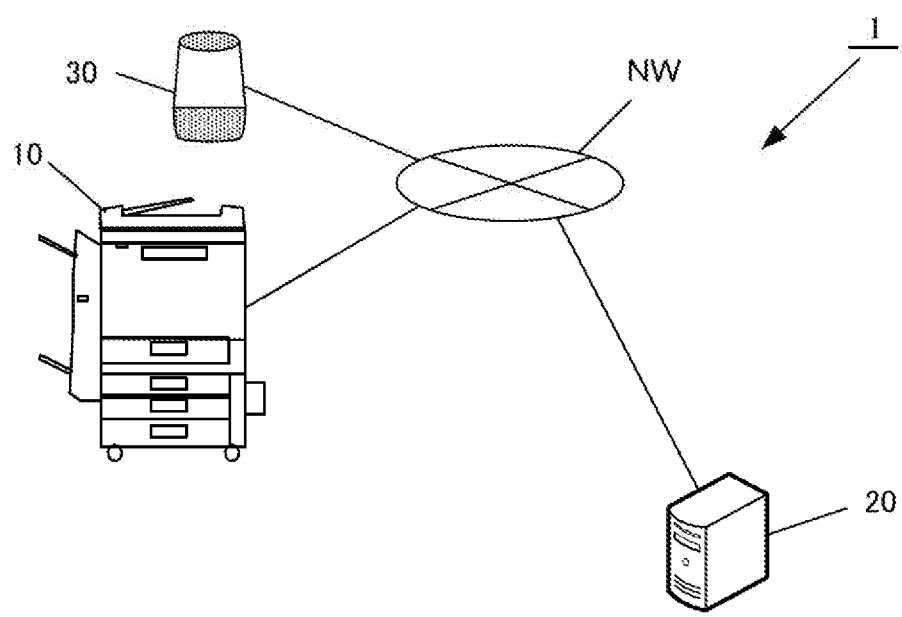
FIG. 1 is a diagram illustrating the configuration of an image forming system according to a first embodiment.
Figure 2:
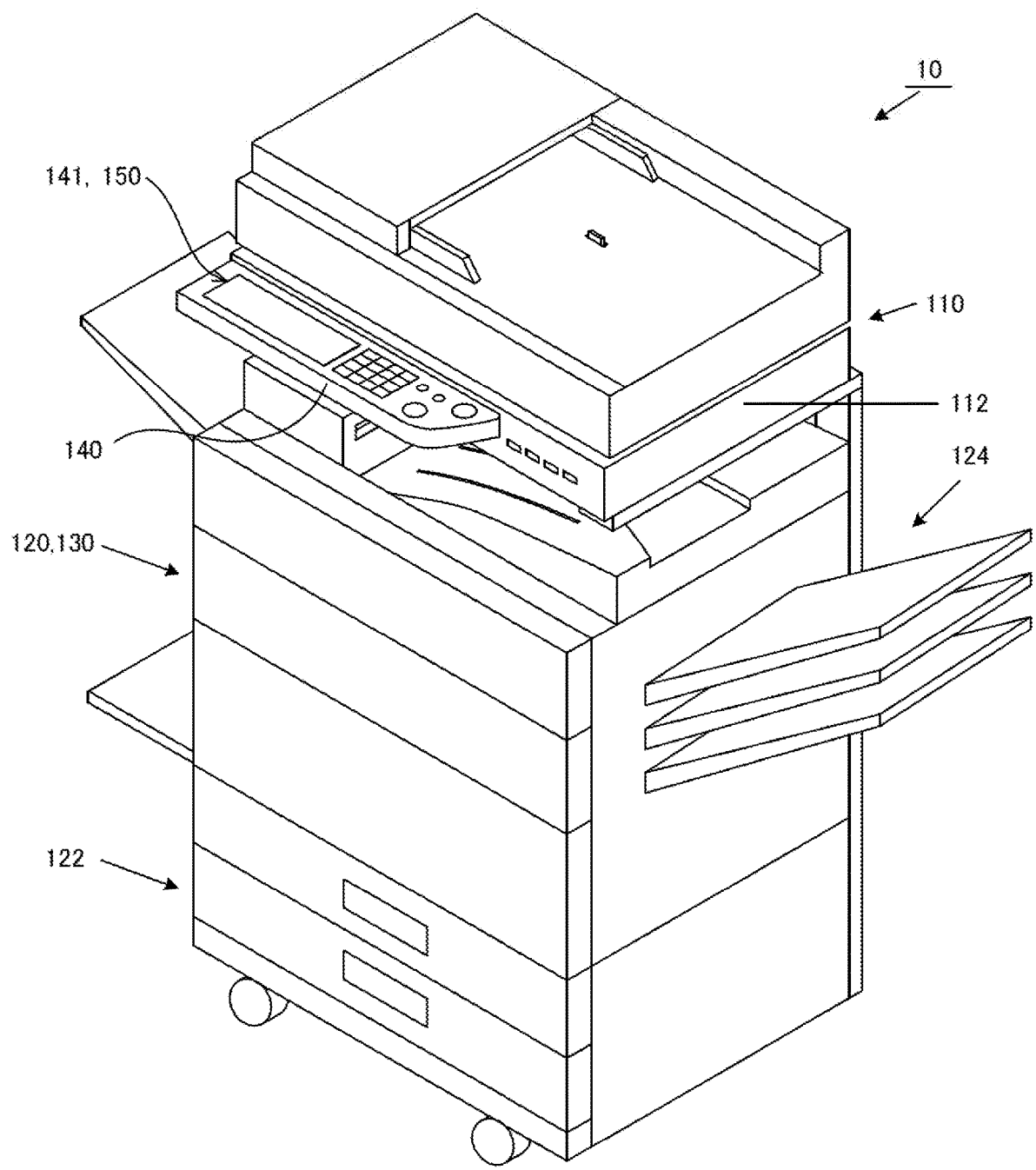
FIG. 2 is a diagram illustrating the configuration of an image forming apparatus of the image forming system.
Figure 3:
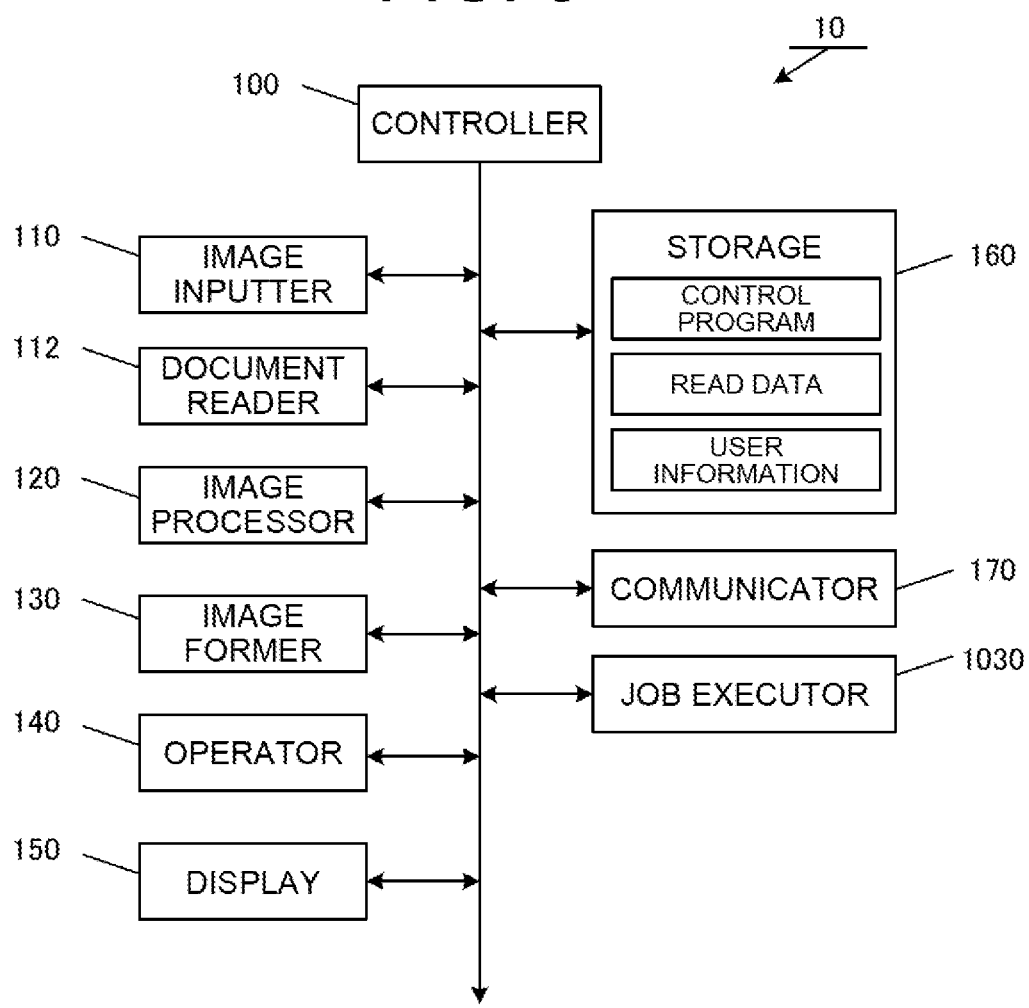
FIG. 3 is a block diagram illustrating the configuration of the image forming apparatus.
Figure 4:
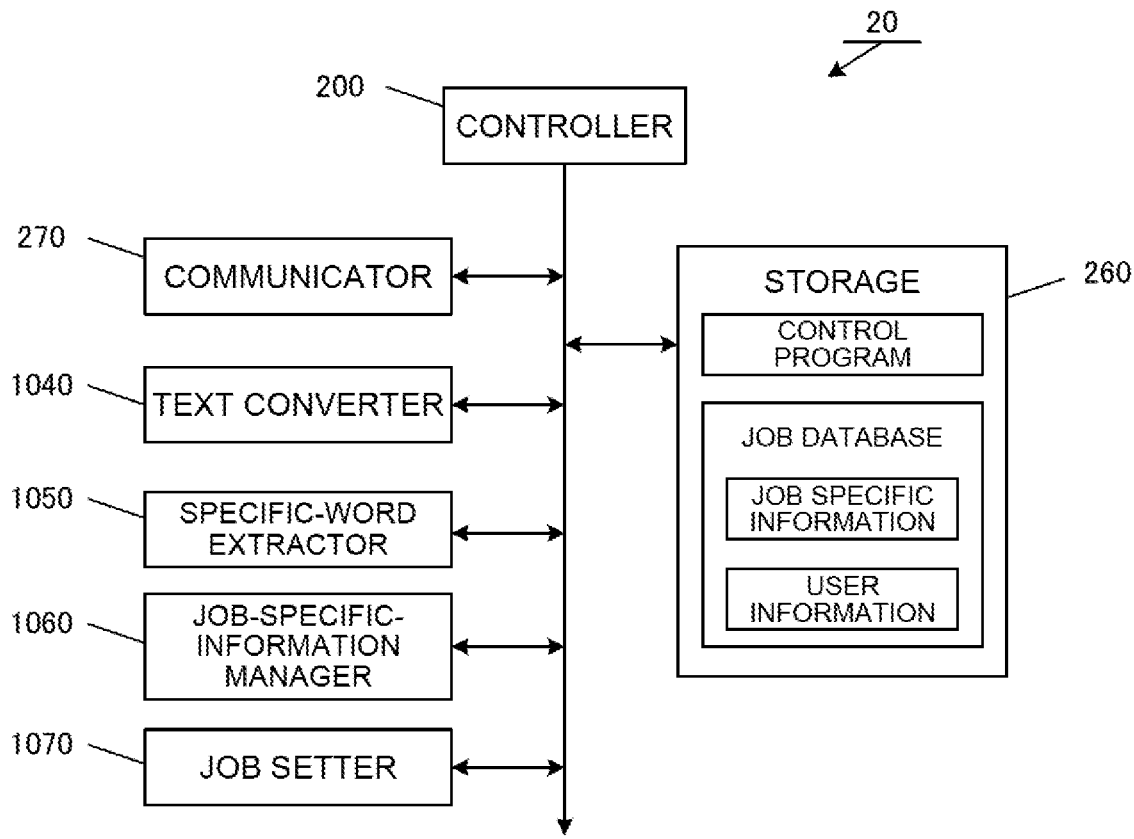
FIG. 4 is a block diagram illustrating the configuration of a server of the image forming system.
Figure 5:
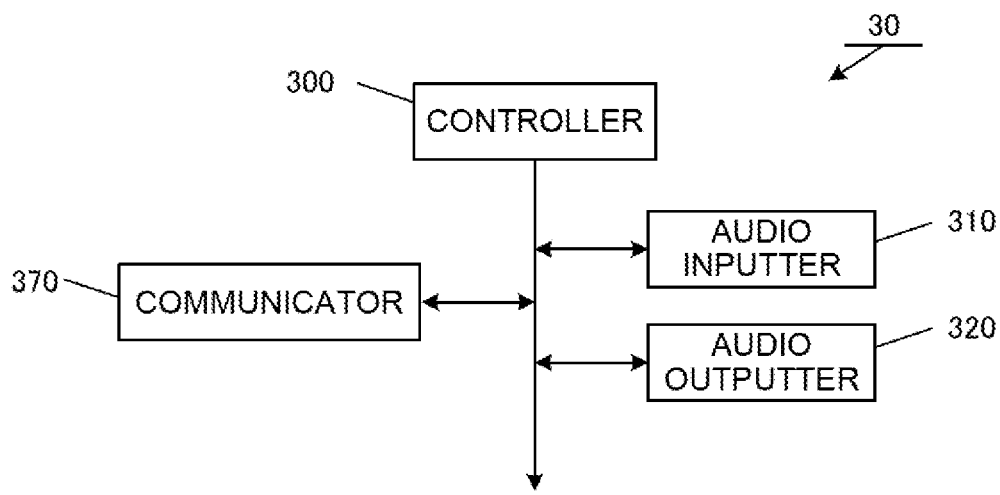
FIG. 5 is a block diagram illustrating the configuration of an audio device of the image forming system.

A first embodiment will now be described with reference to the drawings. FIG. 1 is a diagram illustrating the configuration of an image forming system according to a first embodiment, which is an example embodiment. FIG. 2 is a diagram illustrating the configuration of an image forming apparatus of the image forming system. FIG. 3 is a block diagram illustrating the configuration of the image forming apparatus. FIG. 4 is a block diagram illustrating the configuration of a server of the image forming system. FIG. 5 is a block diagram illustrating the configuration of an audio device of the image forming system. FIG. 6 is a table illustrating an example of job specific information. FIG. 7 is a table illustrating an example of user information.

Configuration of Image Forming System

As illustrated in FIG. 1, an image forming system 1 according to the first embodiment includes an image forming apparatus 10, a server 20, and an audio device 30, which communicate with each other via a network NW.

The server 20 of the image forming system 1 extracts a specific word from voice data input from the audio device 30 and specifies a job corresponding to the specific word. The specified job corresponding to the specific word is then set to be a job to be executed. The image forming apparatus 10 executes the job.

Configuration of Image Forming Apparatus

The configuration of the image forming apparatus 10 of the image forming system 1 according to the first embodiment will now be described.

As illustrated in FIG. 2, the image forming apparatus 10 is an information processing apparatus that includes a document reader 112 at the upper portion of the apparatus body to read an image of a document, and outputs an electrophotographic image.

As illustrated in FIG. 3, the image forming apparatus 10 mainly includes a controller 100, an image inputter 110, a document reader 112, an image processor 120, an image former 130, an operator 140, a display 150, a storage 160, a communicator 170, and a job executor 1030.

The controller 100 is a functional section for comprehensive control of the image forming apparatus 10. The controller 100 provides various functions by retrieving and executing various programs. The controller 100 includes, for example, at least one computing device, such as a central processing unit (CPU).

The image inputter 110 is a functional section for reading image data input to the image forming apparatus 10. The image inputter 110 is connected with the document reader 112, which is a functional section for reading an image of a document, and receives the image data output from the document reader 112.

The image inputter 110 may also receive image data from a storage medium, such as a universal serial bus (USB) memory or a secure digital (SD) card. The image inputter 110 may further include a communicator for establishing connection with other terminal devices and receiving image data from such terminal devices.

The image processor 120 is a functional section for forming an image of output data based on image data on a recording medium, such as a recording sheet. For example, as illustrated in FIG. 2, a recording sheet is fed from a sheet feeder tray 122; an image is formed on the surface of the recording sheet at the image processor 120; and the recording sheet is ejected onto a sheet receiving tray 124. The image processor 120 includes, for example, an electrophotographic laser printer.

The image former 130 is a functional section for performing various types of image processing on the image data. The image former 130 then forms an output image based on the processed image data.

The operator 140 is a functional section for receiving an operation instruction from a user. The operator 140 includes various key switches and a device for detecting a touch input and the like. The user inputs the function to be used and the output conditions via the operator 140. The display 150 is a functional section for displaying various types of information so as to be viewed by a user. The display 150 includes, for example, a liquid crystal display (LCD).

As illustrated in FIG. 2, the image forming apparatus 10 may include a touch panel integrating an operation panel 141 and the display 150. In such a case, the scheme for detecting an input on the touch panel may be any typical detection scheme, such as a resistive film, infrared, electromagnetic induction, or capacitance scheme.

The storage 160 is a functional section for storing various programs, including control programs necessary for the operation of the image forming apparatus 10, various items of data including read data, and user information. The storage 160 includes, for example, a solid-state drive (SSD) and a hard disk drive (HDD), which are semiconductor memories.

The communicator 170 communicates with the server 20 via the network NW. The job executor 1030 executes jobs set in the server 20.

Configuration of Server

The configuration of the server 20 of the image forming system 1 according to the first embodiment will now be described.

As illustrated in FIG. 4, the server 20 mainly includes a controller 200, a storage 260, a communicator 270, a text converter 1040, a specific-word extractor 1050, a job-specific-information manager 1060, and a job setter 1070.

The controller 200 is a functional section for comprehensive control of the server 20. The controller 200 provides various functions by retrieving and executing various programs. The controller 200 includes, for example, at least one computing device, such as a central processing unit (CPU).

The storage 260 is a functional section for storing various programs including control programs necessary for the operation of the server 20, various data including read data, and user information. The storage 260 includes, for example, a solid-state drive (SSD) and a hard disk drive (HDD), which are semiconductor memories.

In the first embodiment, the storage 160 further stores, for example, a job database including job specific information and user information as information of the job-specific-information manager 1060.

As illustrated in FIG. 6, for example, "SETTING NAME", "JOB", "USER", "SETTING ITEM", "DISPLAY VALUE", and "SETTING VALUE" are registered as items of the job specific information. Information is registered to each item. In this way, a job corresponding to each item can be specified on the basis of the job specific information.

The setting name sets the document name, such as "WRITTEN APPROVAL" or "QUOTATION REQUEST". The job sets the function, such as "SCAN" or "COPY". The user sets the user name, such as "YAMADA" or "SATO".

Setting items include "COLOR SETTING (POLYCHROME)". "TRANSMISSION MODE", "DESTINATION", "TRANSMISSION METHOD (CC, etc.)", "output status (STAPLE, etc.)", "medium (DOCUMENT, etc.)", The display values correspond to the setting items. For example, "MONOCHROME" corresponds to "color settings (POLYCHROME)", "E-MAIL" or "SHARED FOLDER" corresponds to "SENDING METHOD", "SUPPLIES DEPARTMENT" corresponds to "DESTINATION", "SELF" corresponds to "sending mode (CC, etc.)", "WITH STAPLES" corresponds to "output status (STAPLE, etc.)", and "BOTH SIDES" corresponds to "medium (DOCUMENT)".

As illustrated in FIG. 7, for example, "NAME" and "MAIL ADDRESS" are registered as user information. In this way, the destination of the user can be specified based on the user information.

The communicator 270 establishes communication connection with the image forming apparatus 10 via the network NW. The text converter 1040 converts audio data input from the audio device 30 into text information through audio recognition. The specific-word extractor 1050 extracts a specific word from the text information.

The job-specific information manager 1060 identifies a job corresponding to a specific word from the job specific information and user information in the job database. The job-specific-information manager 1060 registers new job specific information and user information in the job database. In this way, the job database is updated.

The job setter 1070 establishes a job to be specified on the basis of a specific word.

Configuration of Audio Device

As illustrated in FIG. 5, the audio device 30 mainly includes a controller 300, an audio inputter (microphone) 310, an audio outputter (speaker) 320, and a communicator 370.

The controller 300 is a functional section for comprehensive control of the audio device 30. The controller 200 includes, for example, at least one computing device, such as a central processing unit (CPU).

The audio inputter 310 receives voice uttered by a user. The audio outputter 320 outputs audio data.

The audio device 30 may be a conversational audio device such as a smart speaker that functions as a microphone and a speaker. The audio device 30 may be directly connected to the image forming apparatus 10 for communication.

Processing Steps of Voice Instructions in Image Forming System

The processing steps performed in the image forming system 1 according to the first embodiment when a user operates the image forming apparatus 10 by a voice instruction will be explained with reference to the drawings. FIG. 8 is a sequence diagram illustrating processing steps performed by the image forming system according to the first embodiment when a voice instruction is received.

When a user is to operate the image forming apparatus 10 of the image forming system 1 by a voice instruction, the user first inputs a voice instruction for the start of the operation to the audio device 30 (step S101), as illustrated in FIG. 8. The audio device 30 receives the voice of the user via the audio inputter 310 in the form of audio data (step S103). The audio data is sent from the audio device 30 to the server 20.

In the server 20, the text converter 1040 converts the audio data to text data (step S105). The specific-word extractor 1050 analyzes the context of the text data and extracts a specific word or "keyword" (step S107).

Job settings corresponding to the keyword, on the basis of the keyword extracted from the voice instruction of the user, are retrieved from the job database in the storage 260 of the server 20 (step S109). Parameters required for establishing the job setting are determined (step S111). A request is sent to the image forming apparatus 10 to change the displayed menu to a job setting menu (step S113).

In response to the request sent in step S113, the image forming apparatus 10 displays a job setting menu on the display 150 (step S115). At the same time, a message such as "The job setting menu has been displayed. Please establish job settings". is output from the audio outputter 320 of the audio device 30 (step S116).

The user inputs detailed job settings to the job setting menu displayed on the display 150 of the image forming apparatus 10 (step S117). When the job settings are established, the user instructs the execution of the job by voice (step S119).

When the user establishes the job settings in the setting menu on the display 150, job specific information is sent to the server 20. In the server 20, the job desired by the user is specified by the job-specific-information manager 1060 on the basis of the job specific information.

The job specified by the job-specific-information manager 1060 is set as a job to be executed by the job setter 1070. The job is executed by the job executor 1030 of the image forming apparatus 10 (step S121).

The job specific information used as parameters in the job settings is registered as new job specific information (step S123). The new job specific information is saved in the storage 260 of the server 20 (step S125).

In this way, the job settings are established in the image forming system 1 by a voice instruction from the user.

First Example

Figure 9:
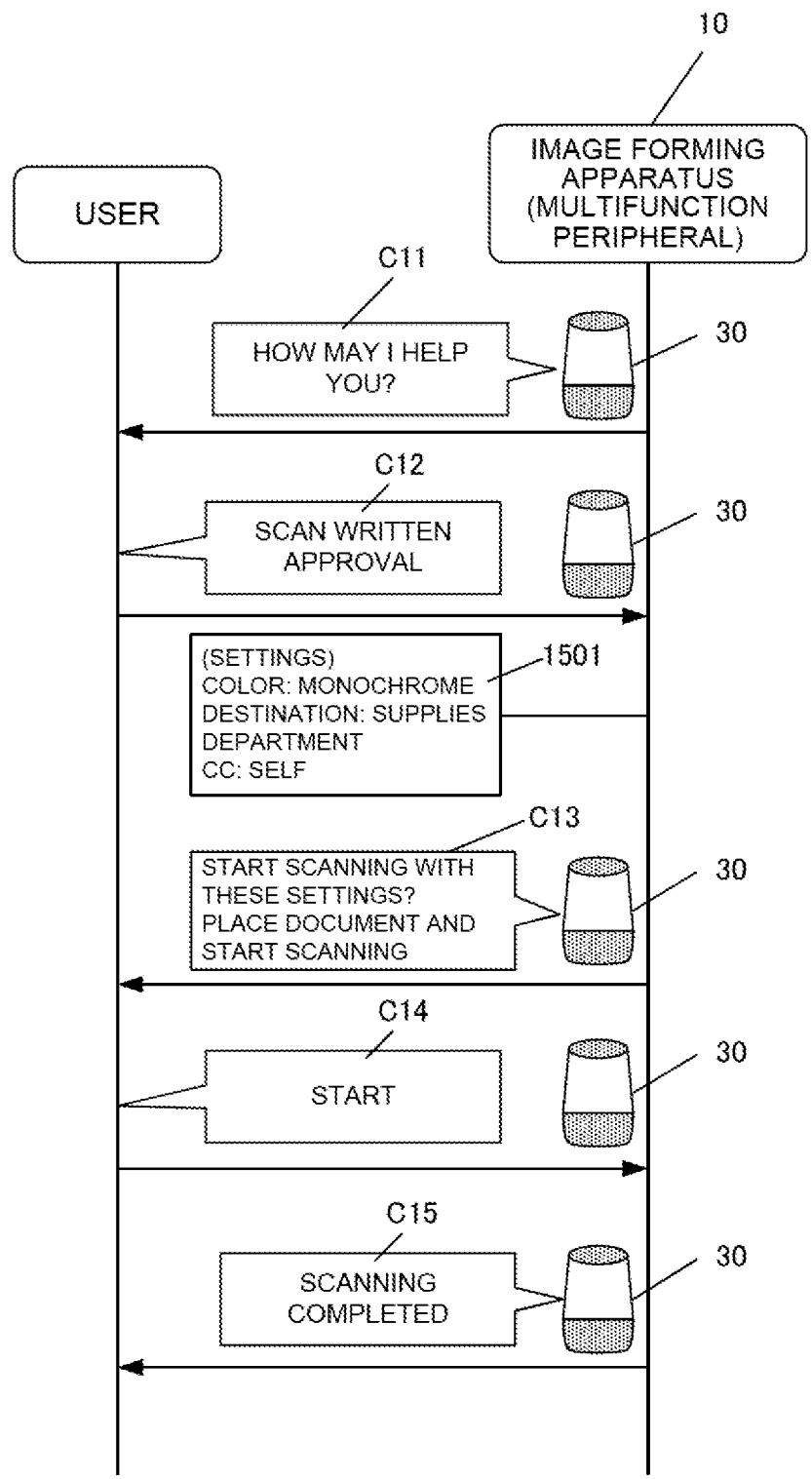
FIG. 9 is a diagram illustrating a first example of a voice instruction input by a user to the image forming apparatus of the image forming system.

A first example in which a voice instruction is carried out in the image forming system 1 according to the first embodiment will now be described with reference to the drawings. FIG. 9 is a diagram illustrating the first example of a voice instruction input by a user to the image forming apparatus by the image forming system according to the first embodiment.

A case in which the user scans a written approval using the image forming apparatus 10 in the image forming system 1 will now be described.

When the image forming apparatus 10 of the image forming system 1 executes a job in response to a voice instruction by the user, the image forming apparatus 10 confirms the user, and the audio device 30 outputs an audio comment C11 "HOW MAY I HELP YOU?", as illustrated in FIG. 9.

In response to this, the user utters a comment C12 "SCAN THE WRITTEN APPROVAL" to give a voice instruction. The image forming apparatus 10 displays a setting menu 1501 on the display 150. The setting menu 1501 displays the printing color (MONOCHROME), the destination (SUPPLIES DEPARTMENT), and CC (SELF) as setting requirements.

The audio device 30 then outputs the audio comment C13 "START SCANNING WITH THESE SETTINGS? PLACE DOCUMENT AND START SCANNING".

In response to this, the user utters a comment C14 "START" to give a voice instruction. The image forming apparatus 10 executes a reading process. When the reading process is completed, the audio device 30 outputs an audio comment C15 "SCANNING COMPLETED". In this way, a scan process (job) of scanning a written approval with multiple settings, such as the print color (MONOCHROME), the destination (SUPPLIES DEPARTMENT), and CC (SELF), can be comprehensively performed with only simple voice instructions, without manual operations.

Second Example

Figure 10:
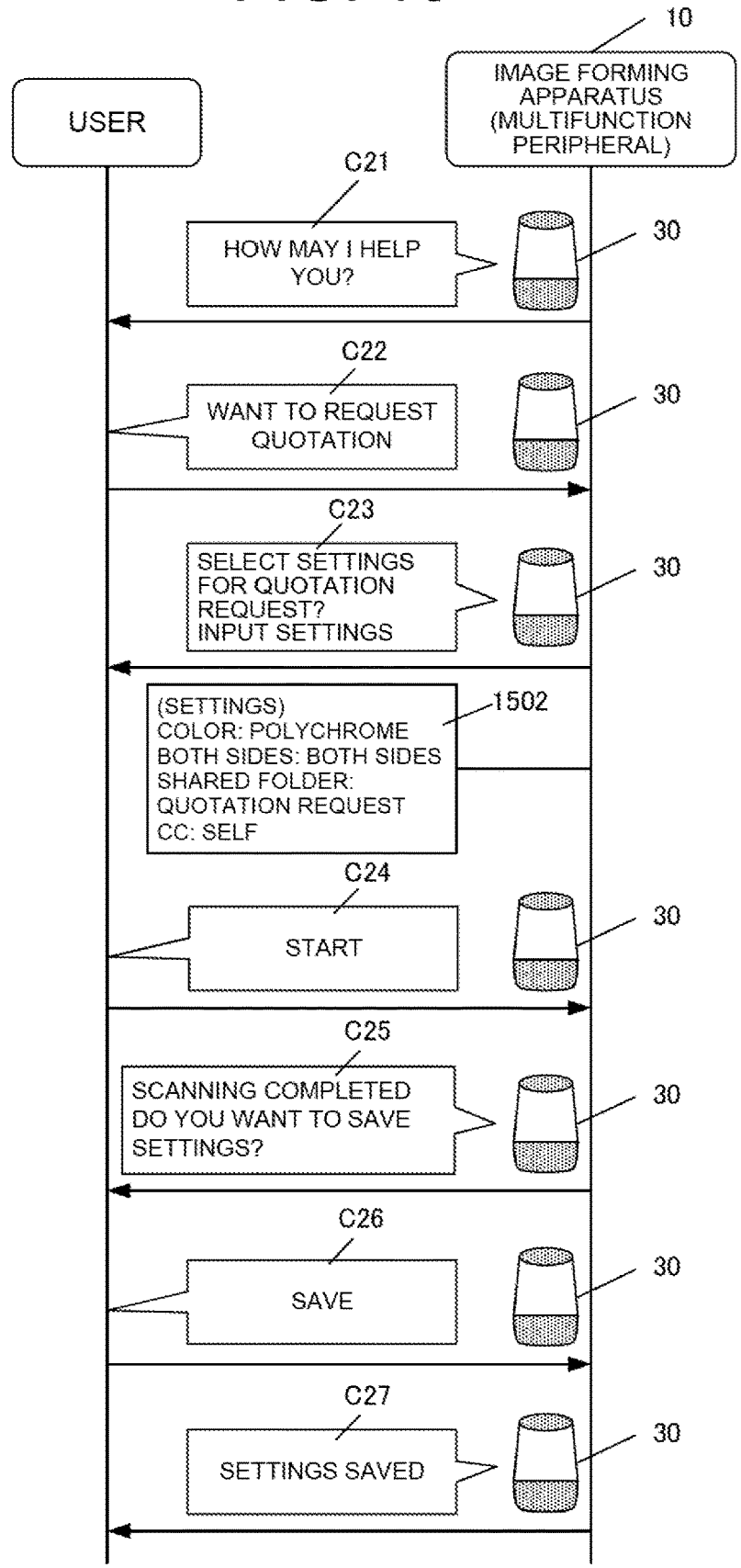
FIG. 10 is a diagram illustrating a second example of a voice instruction input by a user to the image forming apparatus of the image forming system.

A second example in which a voice instruction is carried out in the image forming system 1 according to the first embodiment will now be described with reference to the drawings. FIG. 10 is a diagram illustrating a second example of a voice instruction input by a user to the image forming apparatus of the image forming system according to the first embodiment.

A case in which the user requests a quotation to the image forming apparatus 10 in the image forming system 1 will now be explained.

When the image forming system 1 executes a job in response to a voice instruction input by the user to the image forming apparatus 10, the image forming apparatus 10 confirms the user, and the audio device 30 outputs an audio comment C21 "HOW MAY I HELP YOU?", as illustrated in FIG. 10.

In response to this, the user utters a comment C22 "I WANT TO REQUEST A QUOTATION" to give a voice instruction. The image forming apparatus 10 outputs an audio comment C23 "DO YOU WANT TO SELECT SETTINGS FOR A QUOTATION REQUEST? INPUT THE SETTINGS" from the audio device 30. The image forming apparatus 10 displays a setting menu 1502 on the display 150.

The setting menu 1502 displays the print color (POLYCHROME), the print side (BOTH SIDES), the shared folder (QUOTATION REQUEST), and CC (SELF) as setting requirements.

In response to this, the user utters a comment C24 "START" to give a voice instruction. The image forming apparatus 10 executes a reading process. When the reading process is completed, the audio device 30 outputs an audio comment C25 "SCANNING COMPLETED. DO YOU WANT TO SAVE SETTINGS?"

In response to this, the user utters a comment C26 "SAVE" to receive a voice instruction. After the image forming apparatus 10 saves the settings, the audio device 30 outputs an audio comment C27 "SETTINGS SAVED". In this way, it is possible to request a quotation only by voice instructions, without manual operations.

As described above, the image forming system 1 according to the first embodiment includes an image forming apparatus 10 that is able to receive a voice instruction and a server 20. The image forming apparatus 10 includes a communicator 170 and a job executor 1030. The server 20 includes a communicator 270, a text converter 1040, a specific-word extractor 1050, a job-specific-information manager 1060, a storage 260 for storing job specific information, and a job setter 1070. The server 20 further includes a separate audio device 30 including an audio inputter 310 including a microphone, an audio outputter 320, and a communicator 370. The audio device 30 receives voice instructions from the user given in response to the output audio guidance. In this way, the image forming system 1 allows the user to readily search for a specific job and establish job settings.

That is, for routine work performed on a daily basis, the image forming system 1 according to the first embodiment is able to call up specific settings from, for example, a keyword determined by the application. This allows the user to select the job settings without selecting individual settings. A job can thereby be promptly executed.

When a job is executed after changing the settings, the user can establish these settings to be those for a new application, for example, for use in an application different from the previous one. In this way, these settings can be called up for a new application from the next time.

In the first embodiment, the job database that specifies a job includes job specific information and user information. In this way, the job desired by the user can be readily specified on the basis of a keyword included in the voice instruction by the user.

According to the first embodiment, the job database includes job specific information and user information, and users are established in a job specific information item. In this way, a job can be specified for each user, and the job desired by the users can be readily specified.

For example, an audio recognizer may be provided as a user identifier that identifies a user. The audio recognizer may identify a user on the basis of audio information of the user. Alternatively, a camera may be provided as a user identifier that identifies a user. A user may be identified on the basis of image data from the camera. Alternatively, a user may be identified on the basis of information from an integrated circuit (IC) card or the like for authentication of the user.

In the first embodiment, the image forming system 1 includes the image forming apparatus 10 and the server 20 and establishes job settings. Alternatively, for example, the image forming apparatus 10 may be provided with the function of the server 20 involving job settings and establish job settings the image forming apparatus 10 alone.

In the first embodiment, the configuration of the image forming system 1 is simplified by providing a separate interactive audio device 30 that functions as an audio inputter and an audio outputter. In this way, the user can naturally perform voice operation without being aware of microphones and speakers.

Second Embodiment

The second embodiment will now be described. An image forming apparatus of an image forming system according to the second embodiment includes a microphone and a speaker serving as an audio inputter and an audio outputter, respectively, in place of the audio device 30 according to the first embodiment.

Figure 11:
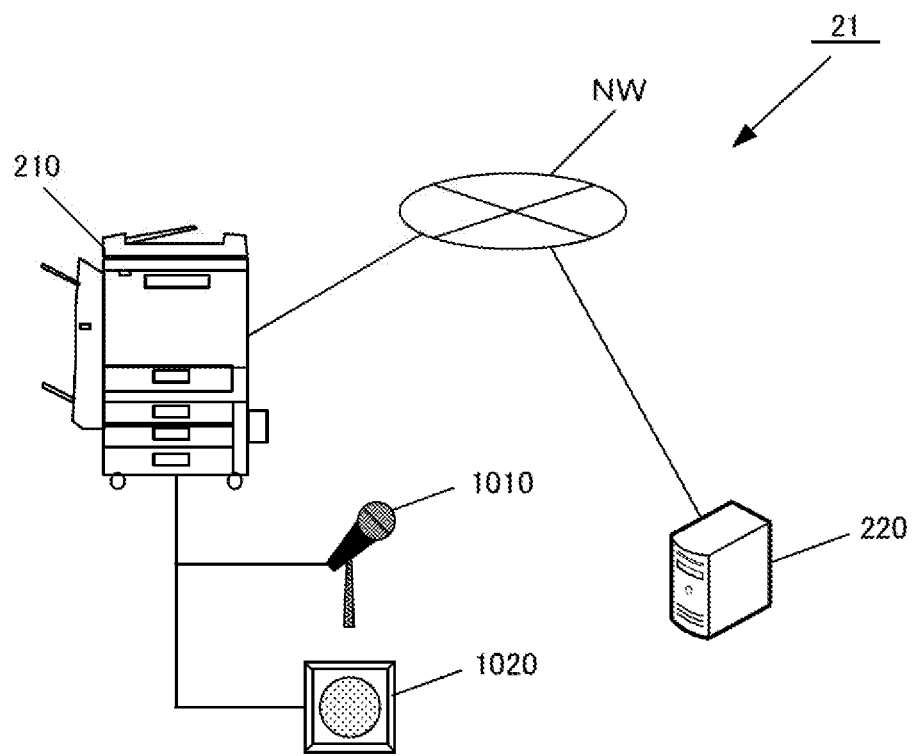
FIG. 11 is a diagram illustrating the configuration of an image forming system according to a second embodiment.
Figure 12:
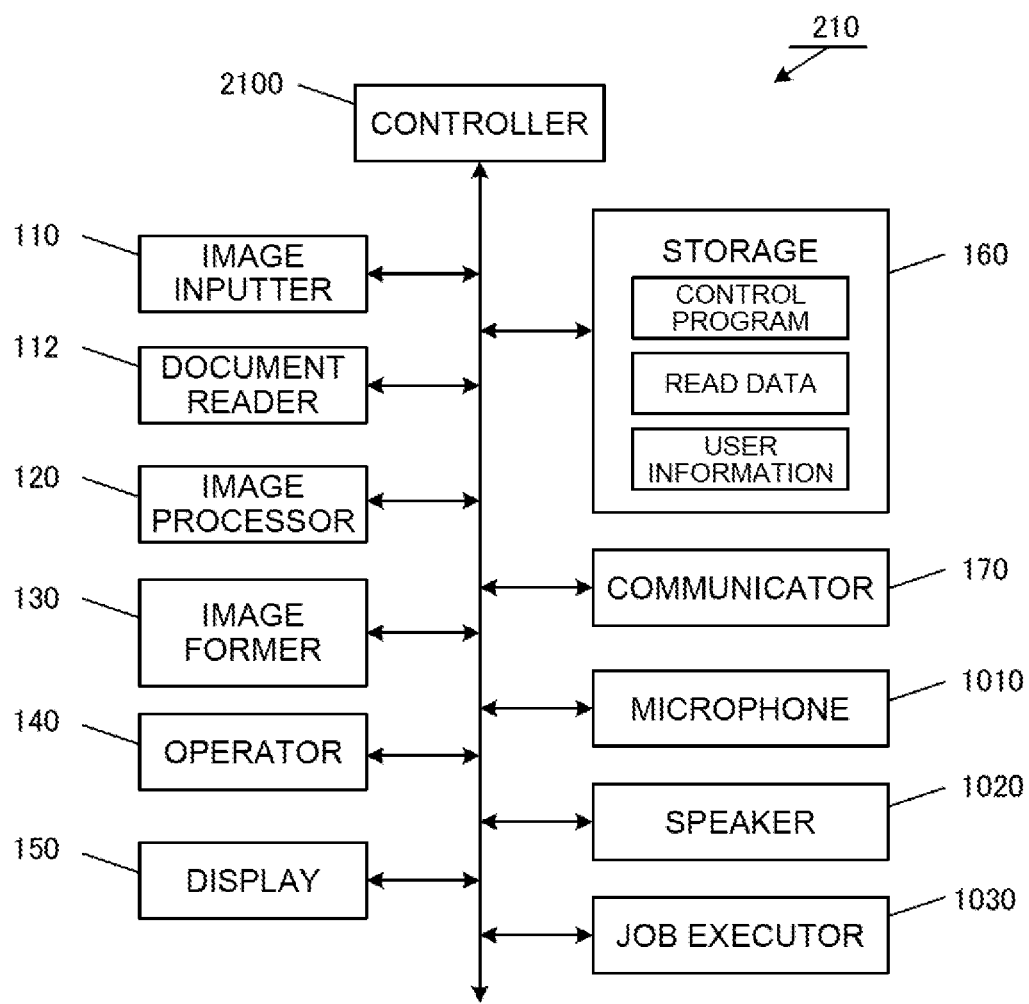
FIG. 12 is a block diagram illustrating the configuration of an image forming apparatus of the image forming system.
Figure 13:
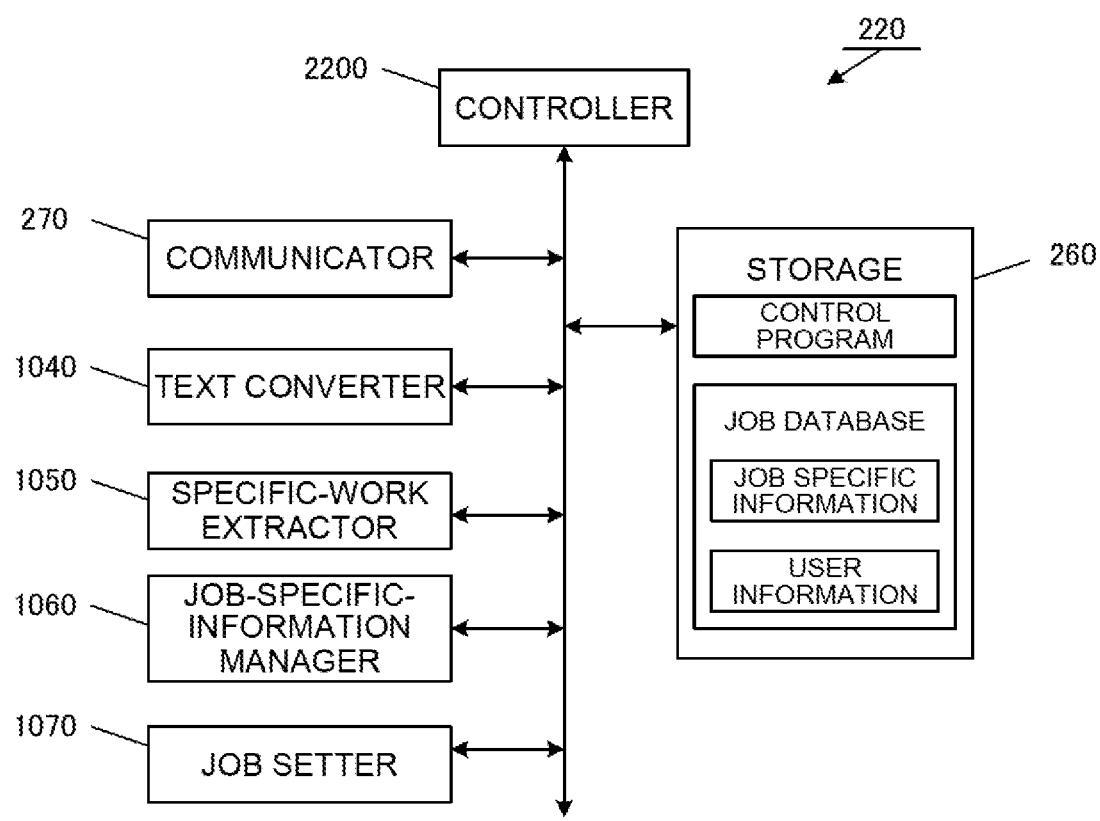
FIG. 13 is a block diagram illustrating the configuration of a server of the image forming system.

FIG. 11 is a diagram illustrating the configuration of an image forming system according to the second embodiment. FIG. 12 is a block diagram illustrating the configuration of the image forming apparatus of the image forming system. FIG. 13 is a block diagram illustrating the configuration of a server of the image forming system.

In the second embodiment, for convenience of explanation, the same configuration as that of the image forming system 1 according to the first embodiment and the same processing steps as those of the first embodiment are denoted by the same reference numerals, and descriptions thereof are omitted.

Configuration of Image Forming System

As illustrated in FIG. 11, an image forming system 21 according to the second embodiment includes an image forming apparatus 210 and a server 220, which communicate with each other via a network NW.

The image forming system 21 includes a microphone 1010 and a speaker 1020. The microphone 1010 functions as an audio inputter that receives an input of voice. The speaker 1020 functions as an audio outputter that outputs a voice. Audio data from the microphone 1010 is converted to text. A specific work is extracted from the audio data input from the microphone 1010. A job corresponding to the specific word is specified. The specified job corresponding to the specific word is then set to be a job to be executed. The image forming apparatus 210 executes the job.

Configuration of Image Forming Apparatus

As illustrated in FIG. 12, the image forming apparatus 210 includes the microphone 1010 and the speaker 1020 in addition to the configuration of the image forming apparatus 10 according to the first embodiment. The image forming apparatus 210 is thereby able to receive a voice instruction.

As illustrated in FIG. 12, the image forming apparatus 210 mainly includes a controller 2100, an image inputter 110, a document reader 112, an image processor 120, an image former 130, an operator 140, a display 150, a storage 160, a communicator 170, a microphone 1010, a speaker 1020, and a job executor 1030.

The controller 2100 is a functional section for comprehensive control of the image forming apparatus 210. The communicator 170 establishes communication connection with the server 220 via the network NW. The microphone 1010 receives voice uttered by a user. The speaker 1020 outputs audio data. The job executor 1030 executes the job established in the server 220.

Configuration of Server

As illustrated in FIG. 13, the server 220 mainly includes a controller 2200, a storage 260, a communicator 270, a text converter 1040, a specific-word extractor 1050, a job-specific-information manager 1060, and a job setter 1070.

The controller 2200 is a functional section for comprehensive control of the server 220.

The communicator 270 establishes communication connection with the image forming apparatus 210 via the network NW. The text converter 1040 according to the second embodiment converts the audio data input from the microphone 1010 to text. The specific-word extractor 1050 according to the second embodiment extracts a specific word from the audio data input from the microphone 1010.

Processing Steps of Voice Instructions in Image Forming System

Figure 14:
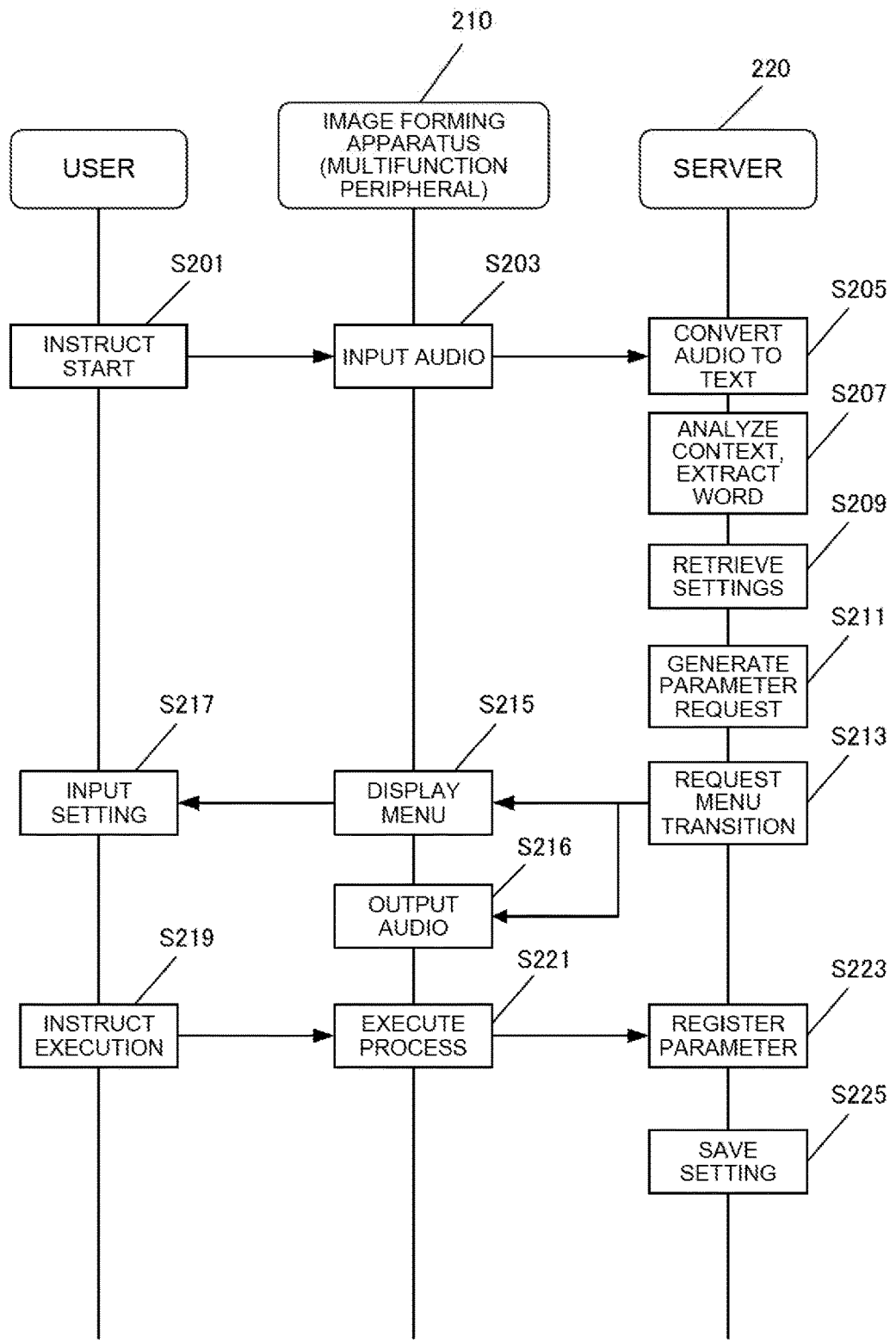
FIG. 14 is a sequence diagram illustrating processing steps performed by the image forming system when a voice instruction is received.

The processing steps performed by the image forming system 21 according to the second embodiment when a user operates the image forming apparatus 210 by a voice instruction will be explained with reference to the drawings. FIG. 14 is a sequence diagram illustrating processing steps performed by the image forming system according to the second embodiment when a voice instruction is received.

When a user is to operate the image forming apparatus 210 of the image forming system 21 by a voice instruction, the user first inputs a voice instruction for the start of the operation to the image forming apparatus 210 (step S201), as illustrated in FIG. 14. The image forming apparatus 210 receives the voice of the user via the microphone 1010 in the form of audio data (step S203). The audio data is sent from the image forming apparatus 210 to the server 220.

In the server 220, the text converter 1040 converts the audio data to text data (step S205). The specific-word extractor 1050 analyzes the context of the text data and extracts a specific word or "keyword" (step S207).

Job settings corresponding to the keyword extracted from the voice instruction of the user are retrieved from a job database in the storage 260 of the server 220 (step S209). Parameters required for establishing the job settings are determined (step S211). A request is sent to the image forming apparatus 210 to change the displayed menu to a job setting menu (step S213).

In response to the request in step S213, the image forming apparatus 210 displays a job setting menu on the display 150 (step S215). At the same time, a message such as "The job setting menu has been displayed. Please select job settings". is output from the speaker 1020 (step S216).

The user inputs detailed job settings to the job setting menu displayed on the display 150 of the image forming apparatus 210 (step S217). When the job settings are established, the user instructs the execution of the job by voice (step S219).

When the user performs job setting in the setting menu on the display 150, the job specific information is sent to the server 220. In the server 220, the job desired by the user is specified by the job-specific-information manager 1060 on the basis of the job specific information.

The job specified by the job-specific-information manager 1060 is set as a job to be executed by the job setter 1070. The job is executed by the job executor 1030 of the image forming apparatus 210 (step S221).

The job specific information used as parameters in the job settings is registered as new job specific information (step S223). The new job specific information is stored in the storage 260 of the server 20 (step S225).

In this way, the image forming system 21 establishes the job settings in response to a voice instruction from the user.

First Example

Figure 15:
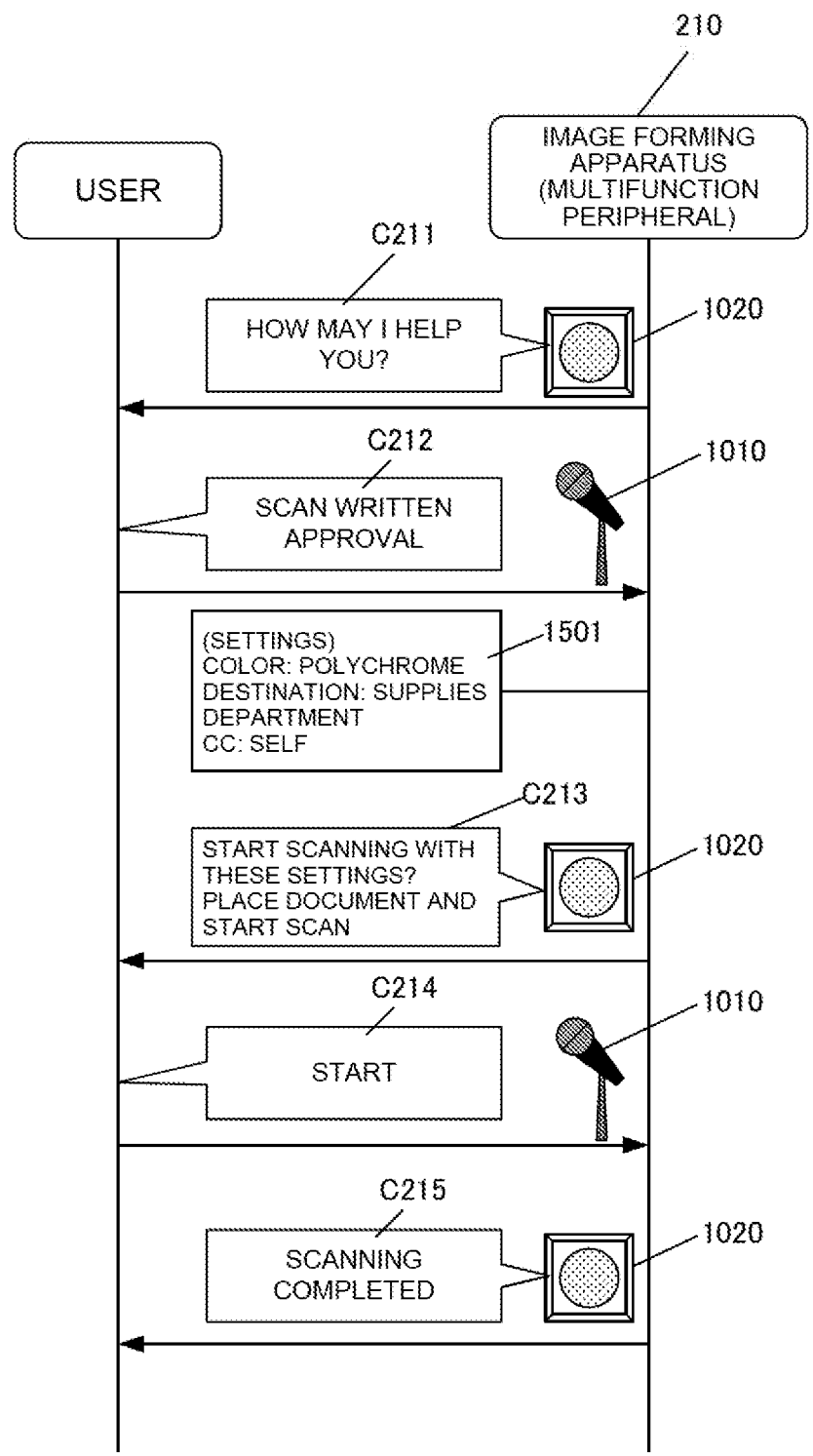
FIG. 15 is a diagram illustrating a first example of a voice instruction input by a user to the image forming apparatus of the image forming system.

A first example in which a voice instruction is carried out in the image forming system 21 according to the second embodiment will now be described with reference to the drawings. FIG. 15 is a diagram illustrating the first example of a voice instruction input by a user to the image forming apparatus of the image forming system according to the second embodiment.

A case in which the user scans a written approval using the image forming apparatus 210 in the image forming system 21 will now be described.

When the image forming system 21 executes a job in response to a voice instruction input by the user to the image forming apparatus 210, the image forming apparatus 210 confirms the user, and the speaker 1020 outputs an audio comment C211 "HOW MAY I HELP YOU?", as illustrated in FIG. 15.

In response to this, the user utters a comment C212 "SCAN THE WRITTEN APPROVAL" to give a voice instruction.

The image forming apparatus 210 displays a setting menu 1501 on the display 150. The setting menu 1501 displays the printing color (MONOCHROME), the destination (SUPPLIES DEPARTMENT), and CC (SELF) as setting requirements.

The speaker 1020 then outputs an audio comment C213 "START SCANNING WITH THESE SETTINGS? PLACE DOCUMENT AND START SCANNING".

In response to this, the user utters a comment C214 "START" to give a voice instruction. The image forming apparatus 210 executes a reading process. When the reading process is completed, the speaker 1020 outputs an audio comment C215 "SCANNING COMPLETED". In this way, it is possible to read the written approval only by voice instructions, without manual operations.

Second Example

A second example in which a voice instruction is carried out in the image forming system 21 according to the second embodiment will now be described with reference to the drawings.

Figure 16:
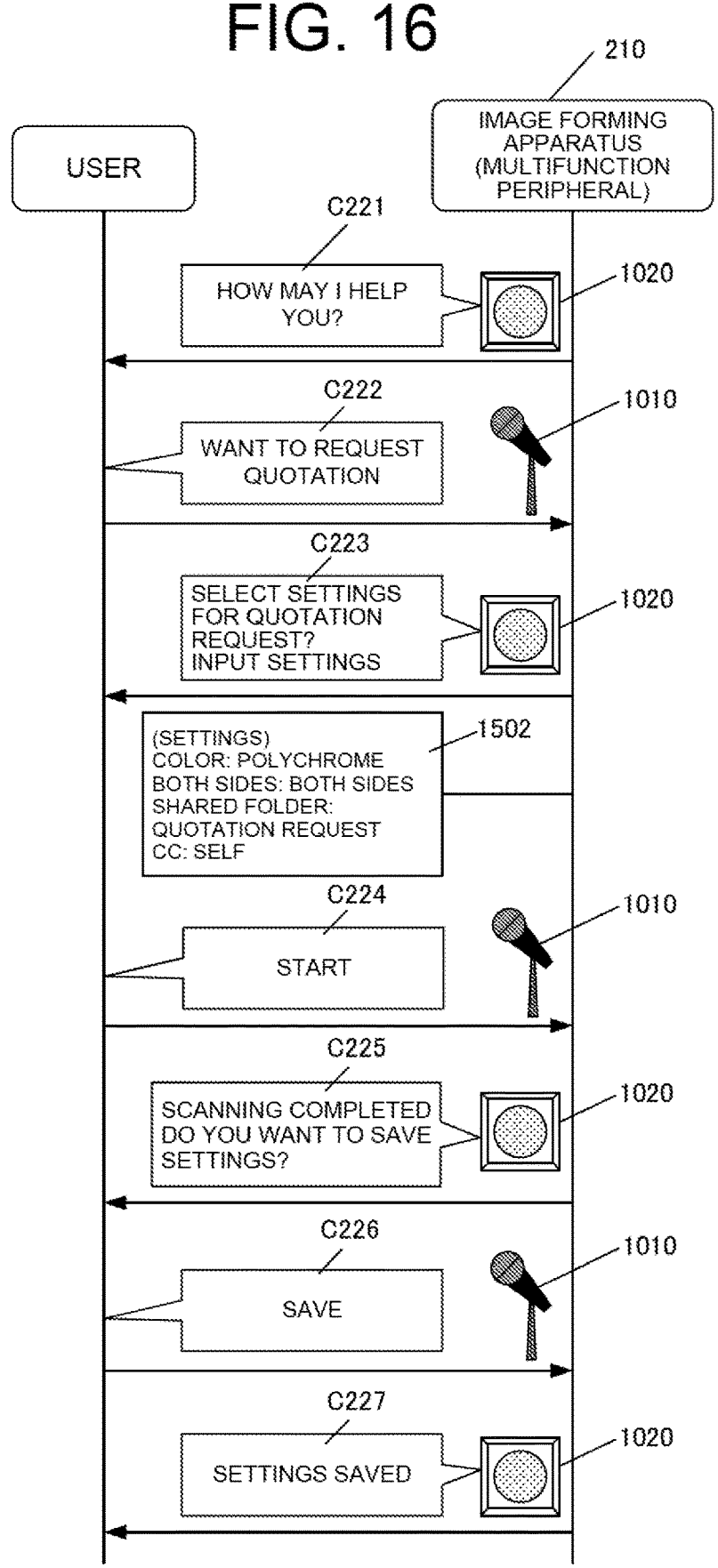
FIG. 16 is a diagram illustrating a second example of a voice instruction input by a user to the image forming apparatus of the image forming system.

FIG. 16 is a diagram illustrating the second example of a voice instruction input by a user to the image forming apparatus of the image forming system according to the second embodiment.

A case in which the user requests a quotation to the image forming apparatus 210 in the image forming system 21 will now be explained.

When the image forming system 21 executes a job in response to a voice instruction input by the user to the image forming apparatus 210, the image forming apparatus 210 confirms the user, and the speaker 1020 outputs an audio comment C221 "HOW MAY I HELP YOU?", as illustrated in FIG. 16.

In response to this, the user utters a comment C222 "I WANT TO REQUEST A QUOTATION" to give a voice instruction.

The image forming apparatus 210 outputs an audio comment C223 "DO YOU WANT TO REQUEST A QUOTATION? INPUT THE SETTINGS." from the speaker 1020. The image forming apparatus 210 displays a setting menu 1502 on the display 150.

The setting menu 1502 displays the print color (POLYCHROME), the print side (BOTH SIDES), the shared folder (QUOTATION REQUEST), and CC (SELF) as setting requirements.

In response to this, the user utters a comment C224 "START" to give a voice instruction.

The image forming apparatus 210 executes a reading process. When the reading process is completed, the speaker 1020 outputs an audio comment C225 "SCANNING COMPLETED. DO YOU WANT TO SAVE SETTINGS?".

In response to this, the user utters a comment C226 "SAVE" to give a voice instruction.

When the image forming apparatus 210 completes a process of saving the settings, the speaker 1020 outputs an audio comment C227 "SETTINGS SAVED".

In this way, it is possible to request a quotation only by voice instructions, without manual operations.

As described above, the image forming system 21 according to the second embodiment includes an image forming apparatus 210 that is able to receive voice instructions and a server 220. The image forming apparatus 210 includes a communicator 170, a microphone 1010, a speaker 1020, and a job executor 1030. The server 220 includes a communicator 270, a text converter 1040, a specific-word extractor 1050, a job-specific-information manager 1060, a storage 260 for storing job specific information, and a job setter 1070. The microphone 1010 and the speaker 1020 receive voice instructions from the user given in response to the output audio guidance. In this way, the image forming system 21 allows the user to readily search for a specific job and establish job settings.

Third Embodiment

The third embodiment will now be described.
According to the third embodiment, in the case where a job desired by the user is not in a job database in the image forming system 1 according to the first embodiment, the job desired by the user can be registered as a set job.

Figure 17:
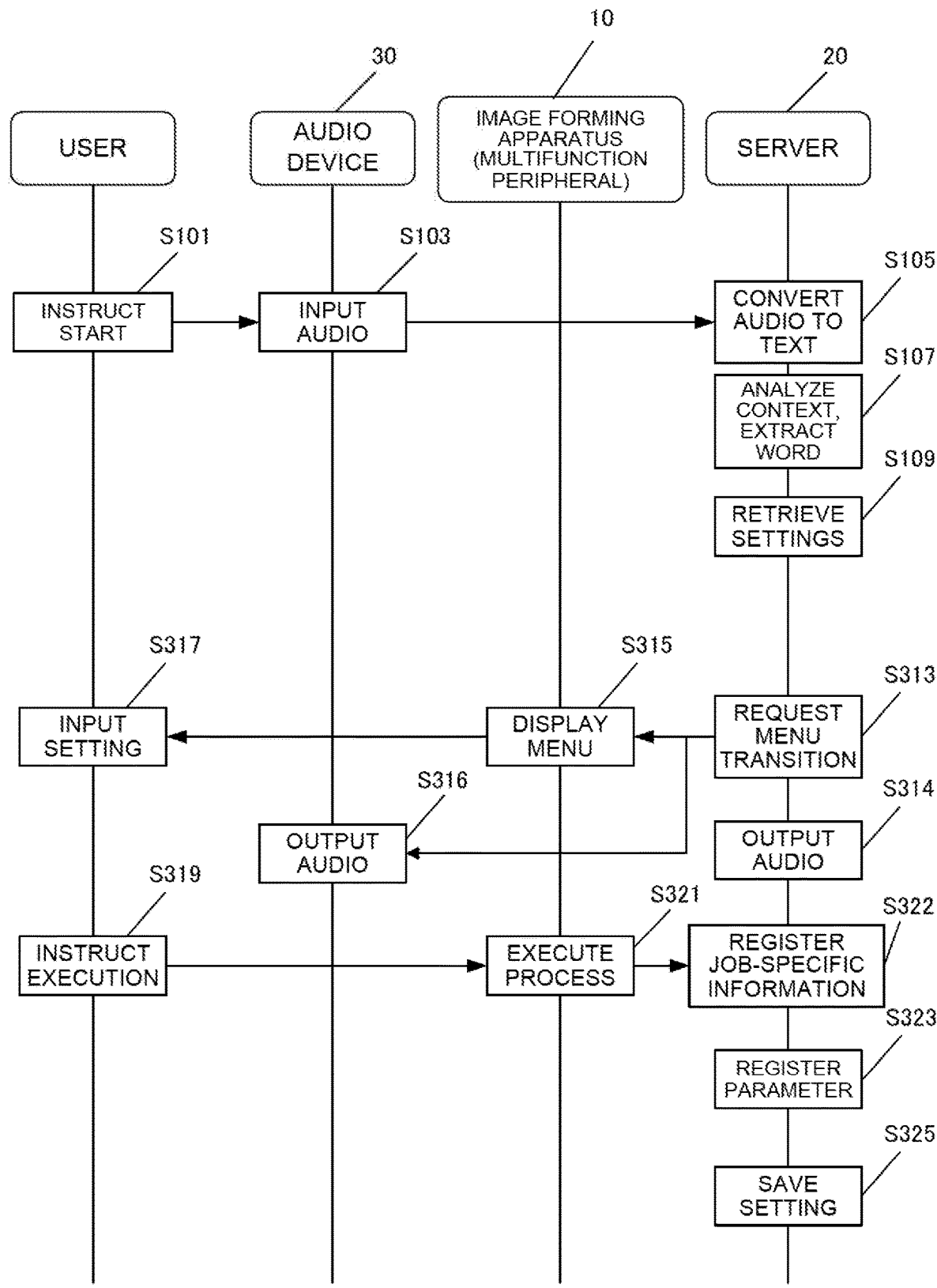
FIG. 17 is a sequence diagram illustrating processing steps performed by an image forming system according to a third embodiment to execute a new job when a job to be executed by a voice instruction is not in a database.

FIG. 17 is a sequence diagram illustrating processing steps performed by an image forming system according to a third embodiment to execute a new job when a job to be executed by a voice instruction is not in a database.

In the third embodiment, for convenience of explanation, the same processing steps as those of the first embodiment are denoted by the same reference numerals, and descriptions thereof are omitted.

In the image forming system 1, as illustrated in FIG. 17, the user inputs the desired job contents by a voice instruction through the audio device 30 (step S101).

If job settings corresponding to a keyword are searched in the job database of the server 20 (step S109), but a job that achieves the job content desired by the user is not retrieved, a request is sent to the image forming apparatus 10 to change the displayed menu to a setting menu for new job settings (step S313). At this time, a voice may be output indicating that the set job for executing the job content is not in the database (step S314).

In response to the request in step S313, the image forming apparatus 10 displays a setting menu for establishing new job settings on the display 150 (step S315). At the same time, an audio message such as "A setting menu for new job settings has been displayed. Please establish new job settings" is output from the audio device 30 (step S316).

The user inputs detailed job settings of the job desired by the user to the setting menu for new job settings displayed on the display 150 of the image forming apparatus 10 (step S317). When the job settings are established, the user instructs the execution of the job by voice (step S319).

The new job specified by the job-specific-information manager 1060 is established as a job to be executed by the job setter 1070. The job is executed by the job executor 1030 of the image forming apparatus 10 (step S321).

The job specific information newly established by the user is registered as new job specific information in the job database by the job-specific-information manager 1060 (S322).

The new job specific information used as parameters in the job settings is registered as new job specific information (step S323). The new job specific information is stored in the storage 260 of the server 20 (step S325).

In this way, in the case where a job desired by the user is not in the database in the image forming system 1, a new job can be registered and executed.

According to the third embodiment having the above-described configuration, in the case where a job desired by the user is not registered as an executable job in a preset database in the server 20, information regarding the job desired by the user may be registered as new job specific information to establish the settings of a job to be executed.

Fourth Embodiment

The fourth embodiment will now be described.

According to the fourth embodiment, in the case where a job to be executed in the image forming system 1 according to the first embodiment is changed to a new job during job execution, the new job is executed.

Figure 18:
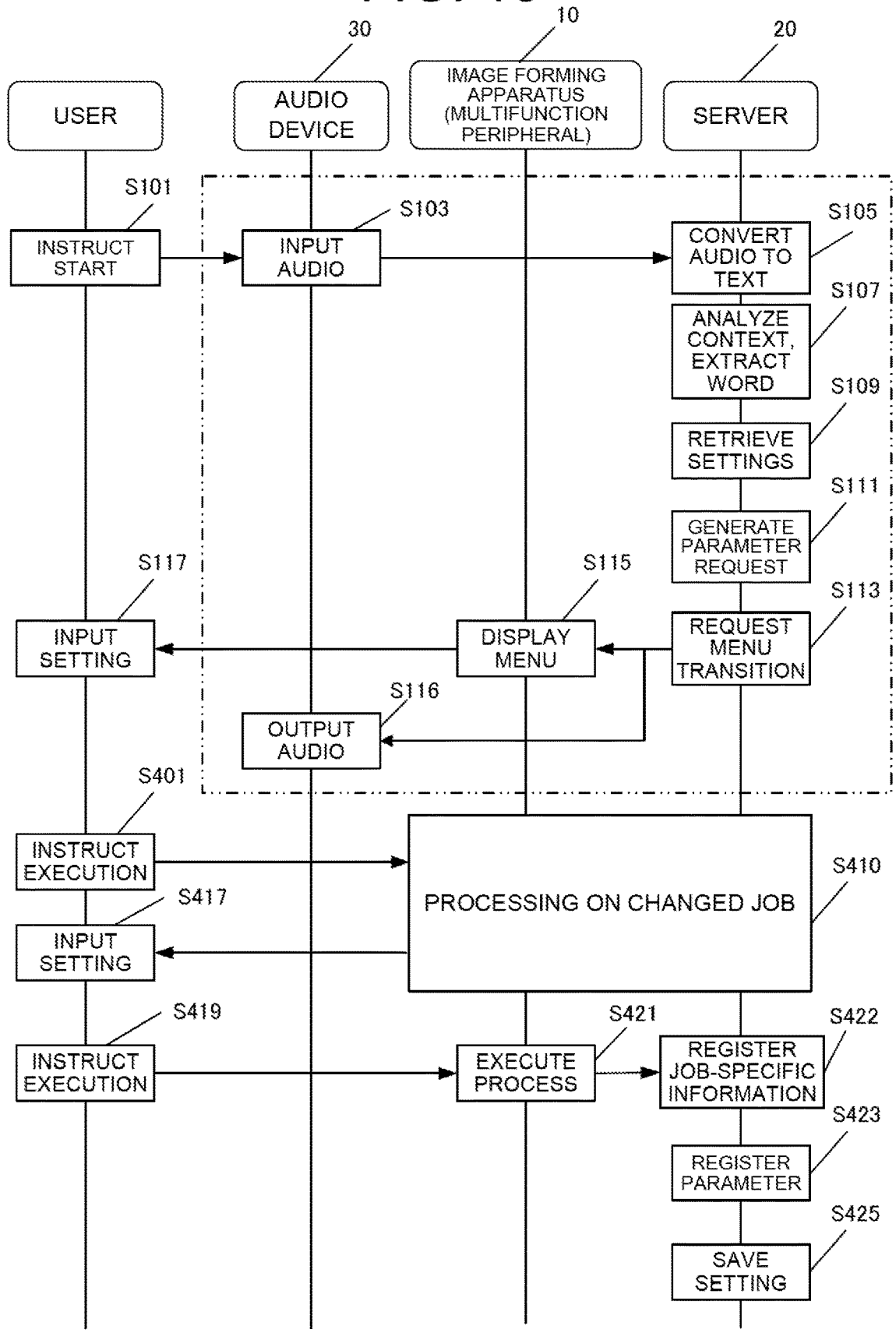
FIG. 18 is a sequence diagram illustrating processing steps performed by an image forming system according to a fourth embodiment to change a job to be executed by a voice instruction.

FIG. 18 is a sequence diagram illustrating processing steps performed in the image forming system according to the fourth embodiment to change a job to be executed by a voice instruction.

In the fourth embodiment, for convenience of explanation, the same processing steps as those of the first embodiment are denoted by the same reference numerals, and descriptions thereof are omitted.

In the image forming system 1, as illustrated in FIG. 18, the job content is input to the microphone 1010 of the image forming apparatus 10 as a voice instruction of the user (step S101). A corresponding job is retrieved from the server 20 (step S109). The user establishes the details of the job to be executed in the job setting menu (step S117).

When an instruction for changing the job without job execution is given by the user as an instruction of job execution (step S401), processes that are the same as the processes for establishing the job settings (steps S103 to S116) are performed on the job to be changed (step S410).

The user inputs detailed job settings to the setting menu to establish settings for the job to be changed displayed on the display 150 of the image forming apparatus 10 (step S417). When the job settings are established, the user instructs the execution of the job by voice (step S419).

The new job specified by the job-specific-information manager 1060 is established as a job to be executed by the job setter 1070. The job is executed by the job executor 1030 of the image forming apparatus 10 (step S421).

The job specific information newly established by the user is registered as new job specific information in the job database by the job-specific-information manager 1060 (S422).

The new job specific information used as parameters in the job settings is registered as new job specific information (step S423). The new job specific information is stored in the storage 260 of the server 20 (step S425).

In this way, the job can be changed and executed when the execution of the established job is instructed in the image forming system 1.

According to the fourth embodiment having the above-described configuration, when an instruction is given to execute an established job and the job to be executed is instructed to be changed, the job can be changed to the instructed new job, and the new job can be registered and executed.

As described above, the present invention is not limited to the above-described examples and embodiments, and various modifications can be made within the scope indicated in the claims. It is apparent to those skilled in the art that various modifications or corrections may be made within the scope of the appended claims, that is, embodiments obtained by combining various modifications of the technical means within the scope of the present invention are also included in the scope of the invention.

DESCRIPTION OF REFERENCE NUMERALS

1,21 image forming system
10, 210 image forming apparatus
20,220 server
30 audio device
100, 2100 controller (for image forming apparatus)
170, 270, 370 communicator
200,2200 controller (for server)
300 controller (for audio device)
310 audio inputter
320 audio outputter
1010 microphone
1020 speaker
1030 job executor
1040 text converter
1050 specific-word extractor
1060 job-specific-information manager
1070 job setter
NW network

What is claimed is:

1. An image forming system comprising:
an image forming apparatus;
a server; and
an audio device,
the image forming apparatus further comprising:
  a first controller;
  a first communicator; and
  a display,
the server further comprising:
  a second controller,
  a second communicator; and
  a storage
wherein,
the storage stores a setting name, a job type and a setting value as job specific information,
the second controller of the server
  receives audio data from the audio device using the second communicator,
  converts the received audio data to text information,
  extracts a specific word from the converted text information,
  specifies a job corresponding to the setting name that matches the specific word,
  sets the job specified as a job to be executed by the image forming apparatus, and sends a request to the image forming apparatus using the second communicator, and the first controller of the image forming apparatus:
  receives the request using the first communicator,
  displays a screen on which the setting value can be input on the display, and
  executes the job set in the server.

2. The image forming system according to claim 1, wherein,
  the audio device is provided in the image forming apparatus, and
  audio data input from the audio device is transmittable to the server.

3. The image forming system according to claim 1, wherein,
  the job specific information further includes user information,
  the second controller of the server
    sets a job instructed by the user as a job to be executed when the job instructed by a user is not stored in the storage, and
    registers new job specific information based on the job when the job is executed by the image forming apparatus, and
  the first controller of the image forming apparatus executes the job.

4. The image forming system according to claim 3, wherein
  the job specific information further includes user information,
  the second controller of the server
    identifies a user, and
    specifies the job by the job specific information and the user specified.

5. The image forming system according to claim 1, wherein, the first controller of the image forming apparatus executes the job when a response confirming from a user is received before the job set is executed.

6. The image forming system according to claim 1, wherein, the first controller of the image forming apparatus executes a job instructed by the user in place of the job set when the different job is instructed by a user before the job set is executed.

7. The image forming system according to claim 1, wherein the setting value includes a destination.

8. An image forming apparatus that receives a voice instruction, the image forming apparatus comprising:
  a controller;
  a storage;
  a display; and
  an audio device, wherein
  the storage stores a setting name, a job type and a setting value,
  the audio device receives an input of audio, and
  the controller
    converts audio data input from the audio device to text information,
    extracts a specific word from the text information,
    specifies a job corresponding to the setting name that matches the specific word,
    sets the job specified as a job to be executed,
    displays a screen on which the setting value can be input on the display, and executes the job specified.

9. A method of forming an image with an image forming apparatus that receives a voice instruction, the method comprising:
  storing a setting name, a job type and a setting value;
  receiving an input of audio;
  converting audio data input to text information;
  extracting a specific word from the text information;
  specifying a job corresponding to the setting name that matches the specific word;
  setting the job specified as a job to be executed;
  displaying a screen on which the setting value can be input on the display; and
  executing the job set specified.

10. A non-transitory computer-readable recording medium that stores therein a program for causing a computer of an image forming apparatus to execute the method according to claim 9.

* * * * *